United States Patent
Hottinen (10) Patent No.: US 7,412,212 B2
(45) Date of Patent: Aug. 12, 2008

(54) COMMUNICATION SYSTEM

(75) Inventor: Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 1113 days.

(21) Appl. No.: 10/308,116

(22) Filed: Dec. 3, 2002

(65) Prior Publication Data

US 2004/0066754 A1 Apr. 8, 2004

Related U.S. Application Data (60) Provisional application No. 60/416,253, filed on Oct. 7, 2002.

(51) Int. Cl.
*H04B 7/02* (2006.01)
*H04M 1/00* (2006.01)
*H04Q 7/20* (2006.01)
*H04B 1/04* (2006.01)
*H04B 7/00* (2006.01)

(52) U.S. Cl. ............... 455/101; 455/562.1; 455/524

(58) Field of Classification Search ........... 455/101, 455/226.1, 69, 562.1, 561, 277.1, 102, 524, 455/522, 525; 370/335, 334; 375/130, 267
See application file for complete search history.

(56) References Cited

U.S. PATENT DOCUMENTS

| | | | |
|---|---|---|---|
| 5,778,317 A * | 7/1998 | Kaminsky | 455/450 |
| 6,192,256 B1 * | 2/2001 | Whinnett | 455/562.1 |
| 6,594,473 B1 * | 7/2003 | Dabak et al. | 455/101 |
| 7,050,759 B2 * | 5/2006 | Gaal et al. | 455/67.13 |
| 7,103,325 B1 * | 9/2006 | Jia et al. | 455/101 |
| 7,116,944 B2 * | 10/2006 | Das et al. | 455/69 |
| 7,218,692 B2 * | 5/2007 | Dabak et al. | 375/346 |

FOREIGN PATENT DOCUMENTS

| | | | |
|---|---|---|---|
| EP | 1207645 | * | 5/2002 |
| EP | 1207645 A1 | | 5/2002 |
| WO | WO 01/67633 | | 9/2001 |
| WO | WO 02/03565 | | 1/2002 |
| WO | WO 02/23743 | | 3/2002 |

OTHER PUBLICATIONS

Jöngren et al. "Combining Beamforming and orthogonal Space-time Block Coding" In: Asilomar Conference on Signals, System and Computers, Oct. 1999, Royal Institute of Technology, Oct. 1, 2001, pp. 1-16.

M. A. Kousa "Multichannel adaptive forward error-correction system" In: Communications, Speech and Vision, IEE Proceedings I, Oct. 1993, vol. 140, issue 5, pp. 357-364.

Kapseok et al. "QoS-based adaptive scheduling for a mixed service in HDR system" In: The 13th IEEE International Symposium on Personal, Indoor and Mobile Radio Communications, Sep. 15-18, 2002, vol. 4, pp. 1914-1918.

* cited by examiner

*Primary Examiner*—Tilahun B Gesessse
(74) *Attorney, Agent, or Firm*—Squire, Sanders & Dempsey L.L.P.

(57) ABSTRACT

A method and system for communication over a wireless network has a plurality of communication channels formed between a plurality of transmitters and at least one receiver and is especially beneficial in a multiuser environment having a plurality of receivers. A characteristic is determined for each channel and then a set of weighting factors is selected to be applied to the transmitters based on the channels characteristics. The weighting factors are selected for optimizing the signal power at a receiver and a quality indication is determined for each channel based on the selected weighting factors. The indication is used to prioritize the allocation of the channels.

36 Claims, 9 Drawing Sheets

| CQI | MAX Tx RATE | MODULATION |
|---|---|---|
| 0 | | |
| 1 | | |
| 2 | | |
| ⋮ | | |
| 20 | 10 MbpS | 8 QPSK |
| ⋮ | | |
| 31 | | |

COMMUNICATION SYSTEM

CROSS-REFERENCE TO RELATED APPLICATIONS

This application claims priority from U.S. provisional patent application Ser. No. 60/416,253, entitled A Communication System, filed on Oct. 7, 2002.

FIELD OF THE INVENTION

The present invention is concerned with the field of wireless communications and in particular a method and system for determining control information which is used by the transmitting base station.

BACKGROUND OF THE INVENTION

The explosive growth of wireless communications along with the associated applications and services that have developed as a result, require communication channels having greater bandwidths for supporting such data intensive applications. Traditionally, one of the biggest bottlenecks in data packet transmissions has occurred in the air interface between the base station and the mobile stations, the so-called radio access network.

Third generation wireless communications (3G) include many standards and techniques which try to increase packet data transmission rates. One such technology, WCDMA HSPDA (High Speed Data Packet access) is envisaged to boost the capacity of downlink data transmission channels to a level capable of supporting the most demanding of multimedia users. For example, at the time of writing it is envisaged that data rates in excess of 20 Mbps will be available for MIMO (Multiple Input Multiple Output) systems. Similar concepts are standardized for cdma2000 systems in the US. In particular within the 1XEV-DV specification (see 3GPP2, The physical layer standard for cdma2000 spread spectrum systems—Release C, TS C. S0002-C, May 2002). Similar data throughput or spectral efficiency targets are envisioned for 4G (Fourth Generation) systems.

Moreover, many modern applications require a certain QoS (Quality of Service) to be established for the application to be correctly supported. For example, a real-time streaming video application to be sent to a user will want to establish that there is a communication channel or channels available to the user which can adequately support the required bit-rate for the relevant time. In addition, the QoS targets can be negotiated between the transmitter and the receiver.

One of the characteristics central to any wireless communication system is the so-called multipath fading effect, which results in constructive and destructive effects being produced due to multipath signals. That is, a transmitted signal may develop a plurality of secondary signals which bounce off or are delayed by certain media, for example buildings, and result in multiple signal paths being created and received.

A method for dealing with such multipath effects is by introducing so-called "diversity" into the system. That is, a plurality of independent paths are created between the transmitter and receiver. These paths can be obtained for example: over time by interleaving coded bits, over frequency by the combining of multipaths in CDMA systems, and over space by using multiple transmit antennas (transmit diversity) or receive antennas (receive diversity). Transmit diversity has been achieved in known systems using open loop space-time codes like STTD (Space Time Transmit Diversity) currently in the WCDMA Release 99 and Release 4 specification (3GPP, Physical Layer General Description, TS 25.202, 2002). The advantages of various diversity techniques have been identified for 3G and even 4G wireless communication systems. Diversity techniques alleviate the effects of poor channel conditions in providing a plurality of other independent channel options.

R. Knopp and P. Humblet in an article entitled "*Information Capacity and Power Control in a Single Cell Multiuser Communications*" published in the Proceedings of the IEEE ICC in Seattle in June 1995, discuss the so-called "multiuser diversity" effect. Multiuser diversity makes use of the fact that in a wireless communication system having many users, each having independent time-varying fading channels, it is likely that at any point in time there is a user with a much better channel conditions than the average. Thus, by scheduling transmissions to mobile stations according to the relative strength of the channels, the overall system performance is improved.

To implement multiuser diversity in a system it is necessary that the transmitter knows the link quality between the transmitter and each of the receivers. In Frequency Division Duplex (FDD) systems this can provided with a feedback control channel, wherein each mobile station tracks its signal quality which is fed back to the base station. It is also necessary that the base station is capable of scheduling transmissions to the relevant base stations and can adapt the transmission criteria as a function of the feedback channel quality. For example, if a mobile station returns channel information that is better than for other channels, the base station scheduler will prioritise transmission over that channel next and based on the quality of the channel will decide what transmission rate to use.

HSDPA relies on link adaptation where the transmitting element has the ability of adapting the transmission parameters to compensate for changing channel conditions. The channel conditions can be estimated based on information fed back from the receiver element. In HSDPA a parameter known as the CQI (Channel Quality Indicator) provides information on the transport format (for example: the coding, modulation, etc) to be used at the base station for transmitting to the mobile station. However, the current HSDPA specification merely describes that a CQI is chosen based on channel information received or measured at the mobile station. It has to be assumed that this channel information would typically be some sort of standard channel quality measure such as the received SNR (Signal to Noise Ratio) or FER (Frame Error rate). Although the Release 4 WCDMA specification (referenced above) does support the use of closed-loop transmit diversity techniques, the Release 5 specification for HSDPA (3GPP, UTRA high speed downlink packet access (HSDPA)—overall description, TS 25.308, 2002). Nor do the Release 5 specifications describe channel allocations means for supporting such techniques.

An International patent application published on 21 Mar. 2002 with publication number WO 02/23743 describes a system for scheduling mobile stations to download data and/or to control the transmission rate from a base station to a mobile station as a function of the downlink channel conditions. The channel conditions are measured at the mobile station and then fed back to a base station for scheduling. This system describes applying random complex scaling factors to different transmitting antennas and then receiving a resulting composite signal at a receiver.

Figure 1:
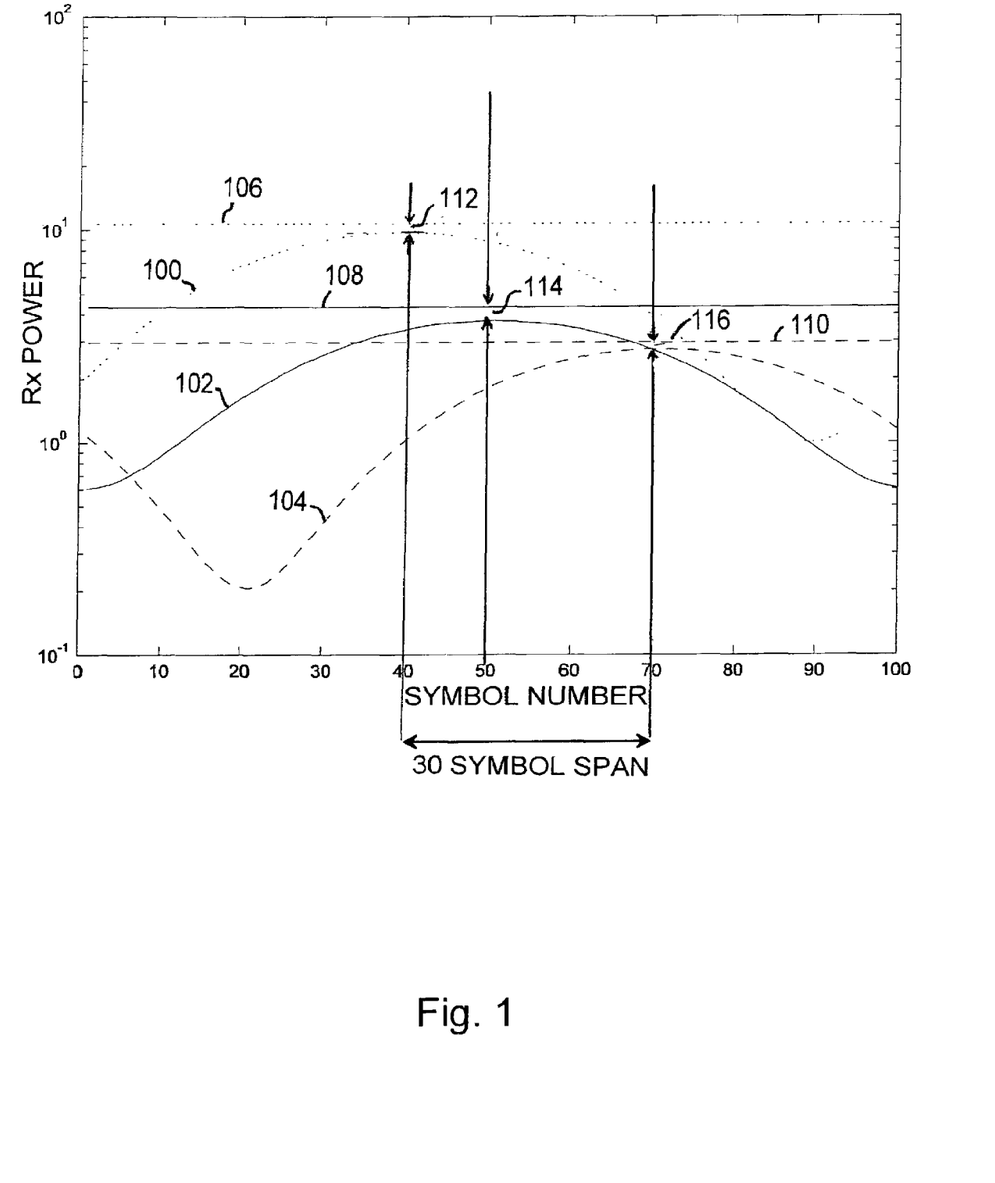
FIG. 1 shows an analysis of a prior art system for multiuser scheduling.

However, the system described in WO 02/23743 does not adequately address the problems encountered for allocating channels in a multiuser environment. Specifically FIG. 1 shows a system with three users 100, 102, 104. Since the scaling factors are not carefully selected, it is apparent that more than one user may be transmitting over a particular channel at an optimal power at any point in time. In FIG. 1 if the window of the scheduler was chosen to span 30 symbols it becomes apparent that this system would not be able to allocate the optimal received power for each user since each user would have part of their maximum in the scheduled interval period. The horizontal lines 106, 108 and 110 indicate the respective maximum received power for the three users 100, 102 and 104 respectively. If the scheduling window lies from symbol numbers 40 to 70 it would catch all three of the maximum received powers for each of the three users and therefore the scheduler in this system would not be able to allocate the optimal received power Rx for each user. FIG. 1 shows that each user falling within this scheduled period of transmission will have to suffer receiving at a less than optimal power Rx as shown by 112, 114 and 116 respectively.

It is an aim of the present invention to provide a method and system for increasing the throughput of a multiuser system with multiple transmitters so that multiuser diversity and channel allocation is improved.

SUMMARY OF THE INVENTION

According to a first aspect of the present invention there is provided a method of communication over a wireless network having a plurality of communication resources formed between a plurality of transmitters and at least one receiver, the method comprising: determining a characteristic for each communication resource; selecting a set of weighting factors to be applied to the transmitters based on the communication resource characteristics; determining for each communication resource a quality indication based on the selected weighting factors; and allocating said communication resources depending on said quality indication.

Preferably, the communication resource is a channel and wherein the characteristic for each communication resource is a channel impulse response.

Preferably, wherein there a plurality of receivers, each receiver selects a set of weighting factors that provides the maximum signal power received at that receiver. The selection is made from a plurality of sets of weighting factors to decide on a final set of weighting factors to be applied to each transmitter.

Preferably, the allocation of said communication resources is prioritised depending on said quality indication.

Preferably, wherein said quality indication is an estimate of a communication resource at some future instant in time based on said selected weighting factors being applied to the transmitters.

According to a further aspect of the present invention there is provided a wireless communication system having a plurality of communication resources formed between a plurality of transmitters and at least one receiver, the system comprising: circuitry for estimating the communication resource characteristics; selection circuitry for selecting a set of weighting factors to be applied to the transmitters based on the channel characteristics; estimation circuitry for determining communication resource quality based on the selected weighting factor; and communication resource allocation circuitry for allocating said communication resource depending on the estimated communication resource quality.

Preferably, wherein the communication resource allocation circuitry comprises: circuitry for deciding on the final weighting array to be applied to each transmitter, and circuitry for determining the best communication resource specified by time, space, code or frequency resulting in the best set of weighting factors and quality indication for said communication resource.

According to yet another aspect of the present invention there is provided a mobile station in a wireless network for communicating with a base station, the base station having a plurality of transmitters so that a plurality of communication resources are formed between the base station and mobile station, the mobile station having: circuitry for determining a characteristic for each communication resource; selection circuitry for selecting a set of weighting factors to be applied to the corresponding transmitters based on the communication resource characteristics; and calculation circuitry for determining for each communication resource a quality indication based on the selected weighting factors.

Preferably, wherein said information obtained from said characteristic determining circuitry, said selection circuitry and said calculation circuitry is fed back to the base station that has channel allocation circuitry for allocating communication resources.

According to still another aspect of the present invention there is provided a base station in a wireless network for communicating with at least one mobile station having at least one receiver, the base station having a plurality of transmitters so that a plurality of communication resources are formed between the base station and mobile station, the base station having: circuitry for determining a characteristic for each communication resource; selection circuitry for selecting a set of weighting factors to be applied to the corresponding transmitters based on the communication resource characteristics; and calculation circuitry for determining for each communication resource a quality indication based on the selected weighting factors; and channel allocation circuitry for allocating said communication resources depending on said quality indication.

Preferably, wherein said base station communicates with a plurality of mobile stations, the base station further comprising: circuitry for receiving a plurality of sets of weighting factors corresponding to each of the plurality of mobile station and deciding on a final set of weighting factors to be applied to the transmitters.

According to yet another aspect of the present invention there is provided a computer program to be used in a wireless communication network having a plurality of communication resources formed between a base station having a plurality of transmitters and at least mobile station having a receiver, the computer program arranged to do the following: calculate a characteristic for each communication resource; process said communication resource characteristics and selecting a set of weighting factors to be applied to the corresponding transmitters based thereon; generate for each communication resource a quality indicator based on the selected weighting factors; and allocate said communication resources depending on said quality indicator.

Preferably, there are a plurality of mobile stations in the wireless network and said computer program is able to perform processing for each mobile station to select a set of weighting factors for each mobile station that results in the maximum signal power being received for that mobile station.

Preferably, wherein the computer program decides from the plurality of sets of weighting factors a final set of weighting factors to be applied to the transmitters.

BRIEF DESCRIPTION OF THE DRAWINGS

Embodiments of the present invention will now be described by way of example with reference to the accompanying drawings, in which.

DETAILED DESCRIPTION OF THE INVENTION

Figure 2:
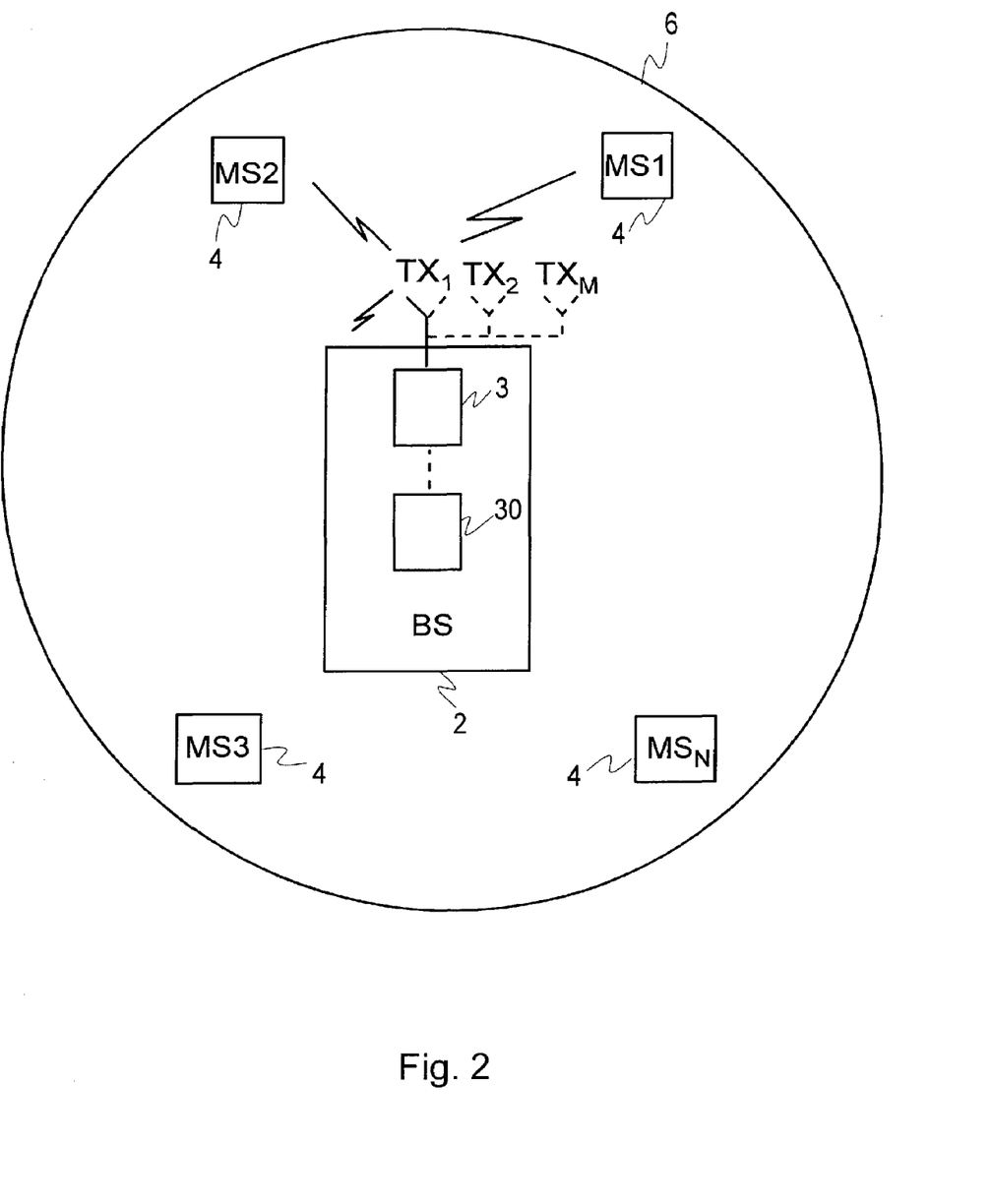
FIG. 2 shows a basic cell structure in a wireless communication system.

FIG. 2 is a general diagram showing the coverage of a single cell 6 of a wireless communication system. The broadcast area of each cell in a communication system is determined by the transmission power of the relevant transmitting base station 2. In this case, the base station 2 is able to transmit to a plurality of mobile stations 4 located within its coverage cell 6. In a typical wireless network each cell 6 will also receive interference from the transmissions produced in neighbouring cells (not shown).

Figure 3:
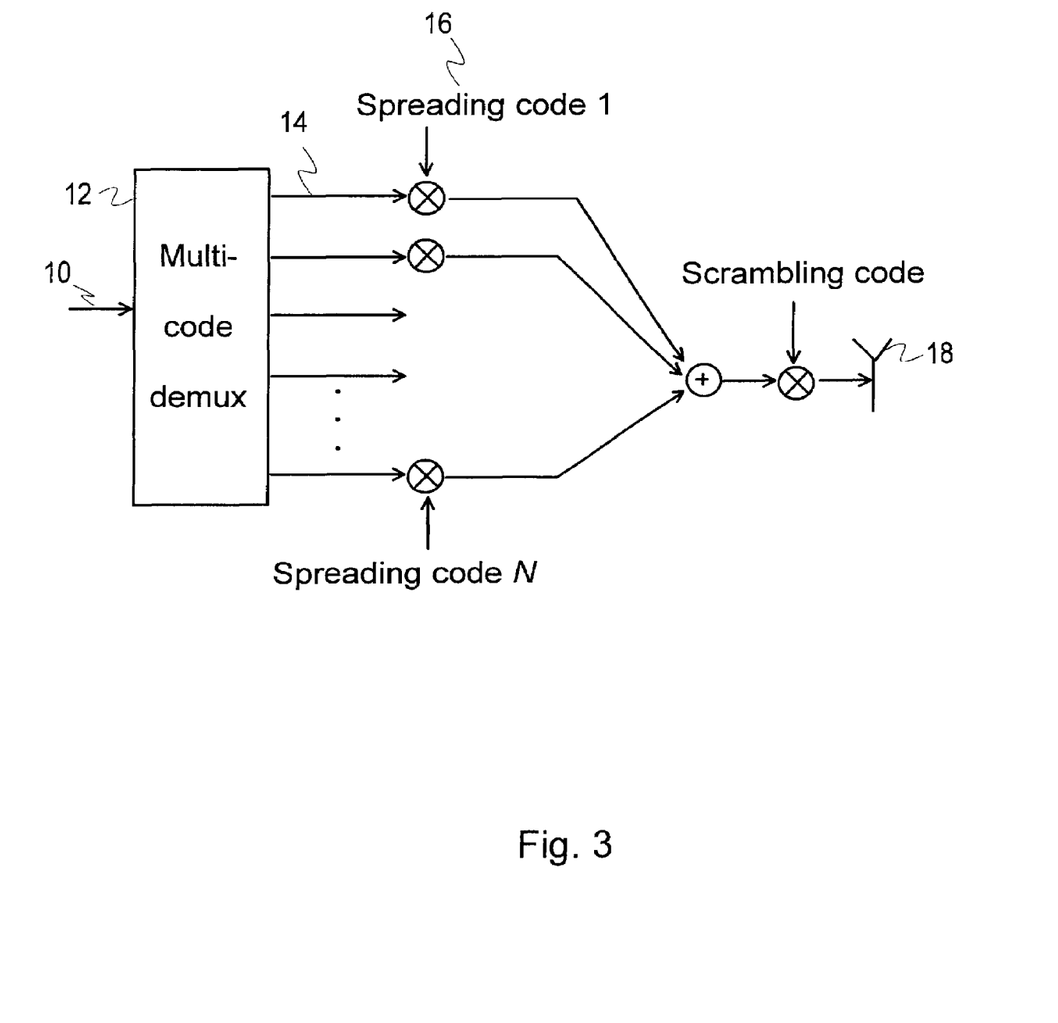
FIG. 3 shows the basic architecture for transmitting on the Downlink Shared Channel (DSCH) for a single antenna transmitter.

FIG. 3 shows the situation when only one transmitting antenna 18 exists within the base station 2 of an HSDPA system. A high data rate source 10 is input into a demultiplexer 12, which separates the high input data stream into 1 to N lower rate data substreams 14. The number N is dependant on the number of channels intended to be used. In the example of FIG. 1 there are four mobile stations 4. Therefore, the demultiplexer 12 spreads the input data stream into four lower rate substreams using 4 spreading codes 16 (i.e. N=4), in which each substream has its own spreading code which is mutually orthogonal to the others. The substreams are then summed, scrambled and then transmitted by the RF antenna 18 to the mobile stations 2.

Figure 4:
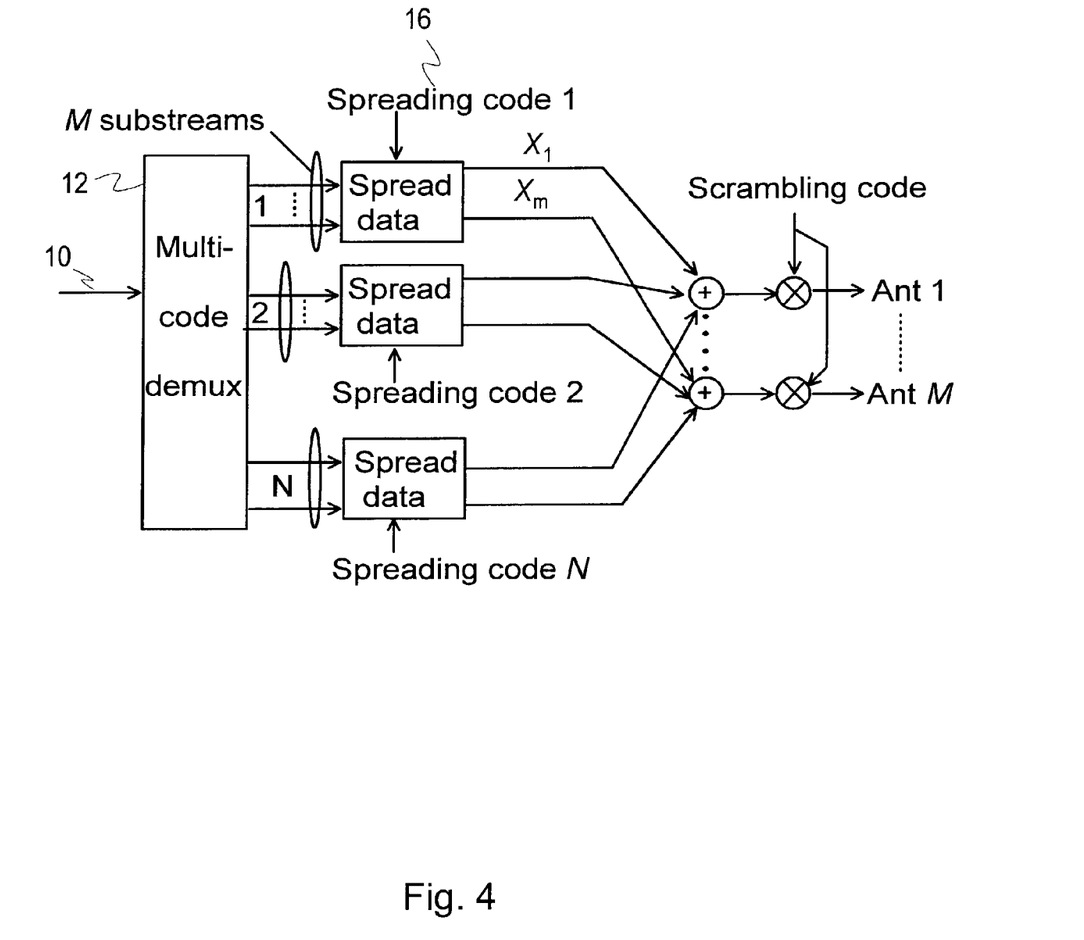
FIG. 4 shows the basic architecture for transmitting on the Downlink Shared Channel (DSCH) for multiple antenna transmitters.

FIG. 4 shows the situation wherein a transmit diversity case in which there are M multiple transmit antennas transmitting from base station 6. In this case, the demultiplexer 12 separates the input high rate data stream 10 into M.N substreams or, put slightly differently, N groups of M substreams are formed, in which N represents the number of users in the cell 6 and M represents the number of transmitting antennas in the base station 2. Thus, for example if two antennas are used to transmit from base station 2, then the demultiplexer 12 will output eight lower rate substreams or 4 groups each having two substreams. Each group of substreams is manipulated by a unique spreading code 1 . . . N and then each lower rate substreams corresponding to the relevant antenna is summed, scrambled and transmitted.

Figure 5:
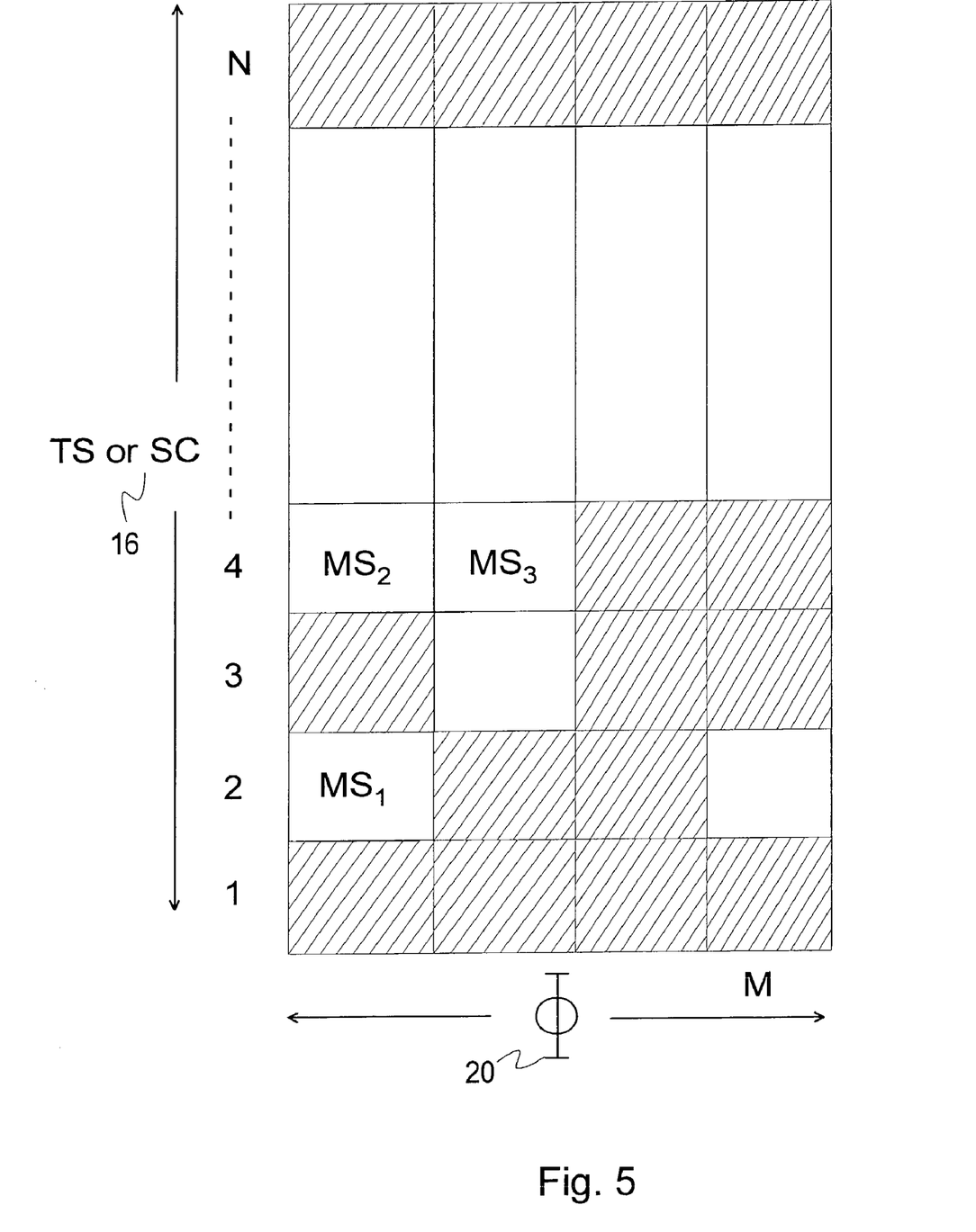
FIG. 5 shows a two-dimensional grid of scheduling transmissions in a transmit diversity scenario.

FIG. 5 is an example of a two dimensional grid of a transmit diversity situation for demonstrating the operation of a simple scheduler. The system has many potential communication channels formed by a plurality of antennas M and a number of spreading codes N (for example as shown in FIG. 3). The scheduler has the task of scheduling data transmissions to particular mobile stations at certain instants in time depending on the fed back channel information. Thus, the word scheduler has become synonymous with TDMA (Time Division Multiple Access Techniques). Instead, different embodiments of the present invention allow all of the known forms of multiplexing to be used. Instead of using the term "scheduler", the term "channel allocator" will be referred to herein to emphasise the flexibility of the various embodiments envisaged for the present invention.

For conceptual purposes, the present embodiment of the channel allocator shown in FIG. 5 is limited to two dimensions, i.e. space (SDMA) using M transmit beams and time (TDMA) using N unique time slots. It should be appreciated that this grid could become multi-dimensional if for example CDMA (Code Division Multiple Access) and FDMA (Frequency Division Multiple Access) techniques were also used. For example, if a CDMA application as shown in FIG. 4 were to be contemplated then the vertical axis could be thought of as comprising N unique codes.

The grid of FIG. 5 has a vertical axis corresponding to the N time slots used for each of the N users and a horizontal axis corresponding to different M beams. The signals transmitted simultaneously via each of the M beams need to be differentiated from one another by some orthogonality factor Φ 20, which is typically done using beamforming. For example Φ could designate different transmit directions. In general, the beams can be formed by arbitrary means, as long as all beams are not identical.

For the purposes of explanation, the grid shows how channels have been allocated at a particular instant in time t, in which base station 2 is simultaneously transmitting data to three mobile stations MS1, MS2, MS3. That is, at time t data is being transmitted simultaneously to a first mobile station MS1 over a first channel using the first beam Φ1 and the second time slot TS2, also data is being transmitted to the second mobile station MS2 over a second cannel using the beam Φ1 and the fourth time slot TS4, and data is being transmitted to the third mobile station MS3 over a third channel using a second beam Φ2 and the fourth time slot TS4.

Channel information corresponding to the channels is fed back to base station 2 from the receiving mobile stations 4. This can be done for example, using one of the uplink control channels, and the information can be transmitted when requested, at regular intervals, or the receiver can transmit it when the channel state changes. The channel allocator is then able to determine from the received channel information, which channels are the strongest, or which would maximize throughput or transmit efficiency. As an example, the grid shows all channels having poor signal quality as being shaded out. Poor signal quality may be a result of interference from neighbouring channels, propagation delay, fading, noise, etc.

However, the channels not shown as being shaded have good quality and depending on the relevant transmission requirements, for example, during a subsequent time period t+1, the channel allocator will maintain the channel for MS3, but will re-schedule the channels corresponding to MS1 and MS2 respectively. This is done because the channel information feedback indicates that the current channel for MS1 is becoming poor and would be better if it is re-scheduled for the third time slot TS3 of beam Φ2. Similarly the channel for MS2 is becoming poor and will be re-scheduled as shown at a certain time.

Figure 6:
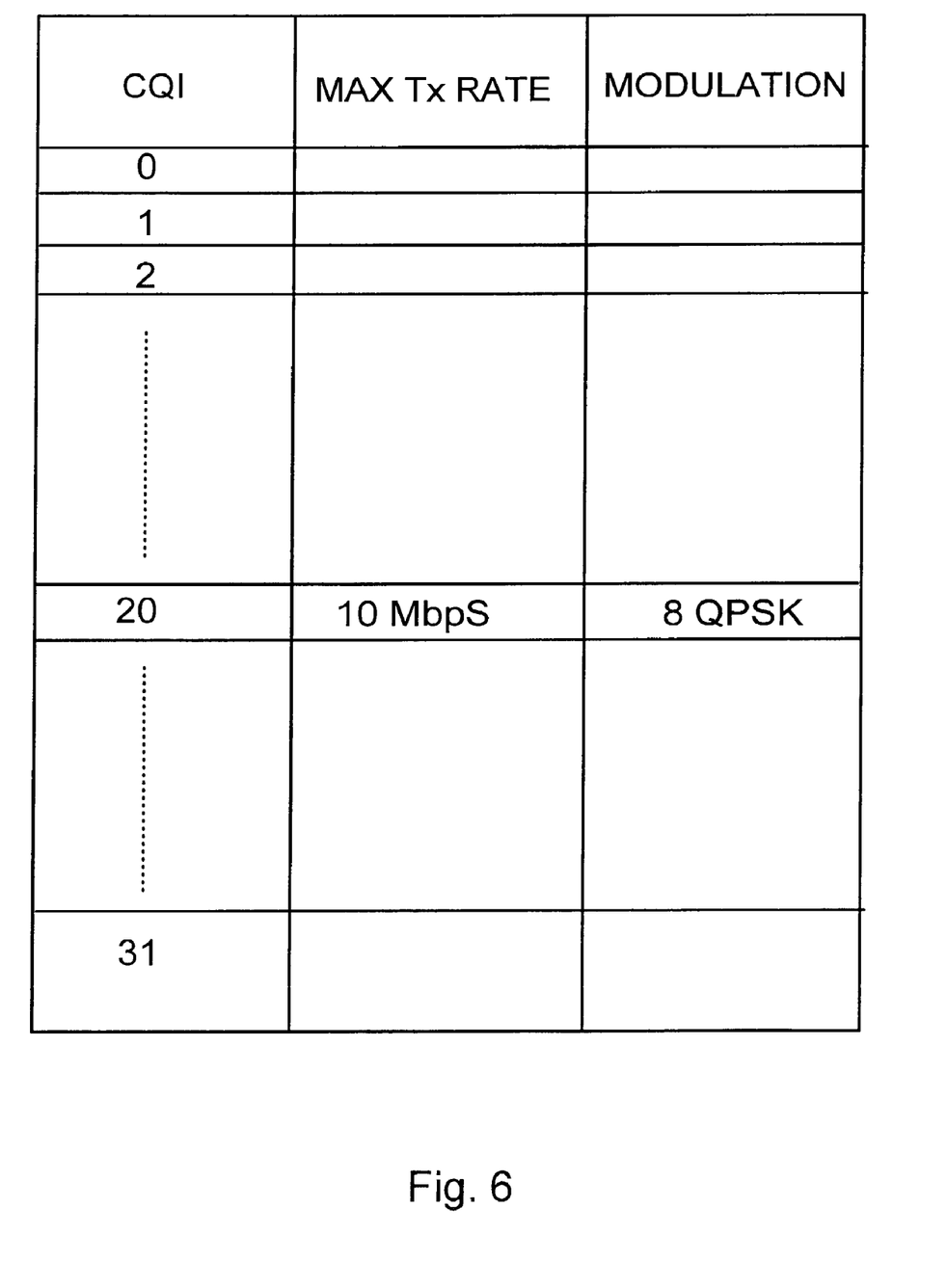
FIG. 6 shows a CQI index table according to an embodiment of the present invention.

Turning now to HSDPA, and related concepts, a CQI value has been defined which specifies to a transmitter of a base station how data is to be transmitted. For example, FIG. 6 shows a CQI table having 32 possible values, each indexing respective rows of transmission information. In HSDPA it is assumed that some type of basic channel measurement, for example a SNR (Signal to Noise Ratio) is taken at the mobile station. Based on this measurement information a CQI is selected which specifies the type of modulation to be used and the maximum transmission rate. So if a CQI value of 20 is selected from the table shown in FIG. 6 then the maximum transmission rate sent to the transmitter of the base station (via a feedback channel) will be 20 Mbps and the modulation method to be used is 8-QPSK (Quadrature Phase Shift Keying).

Figure 7:
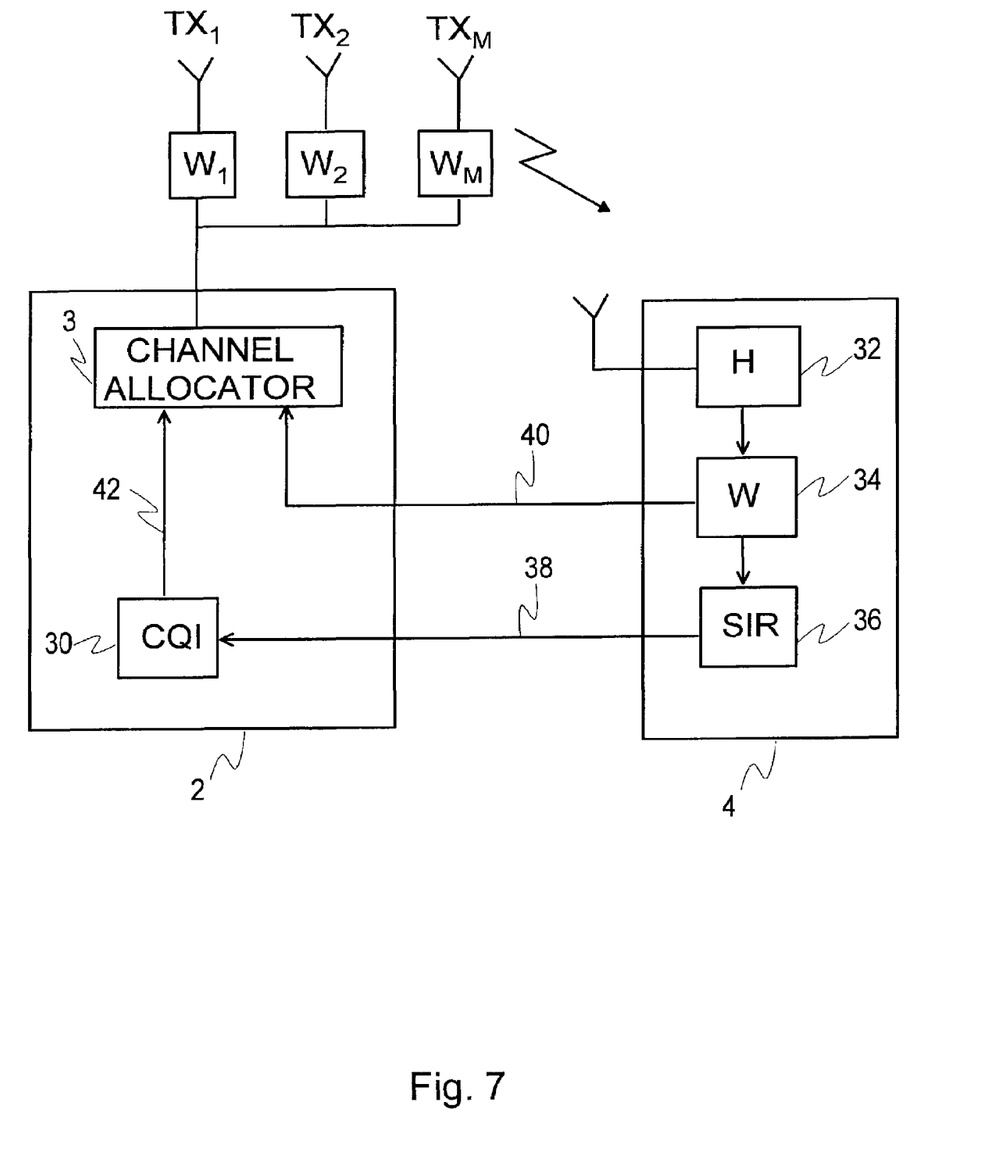
FIG. 7 shows the structural elements for implementing one embodiment of the present invention.

According to an embodiment of the present invention as shown in FIG. 7, the CQI value may take on a slightly different meaning, in that it can also be considered as a more useful estimate of the channel quality information hereinafter referred to as SIR (Signal to Interference Ratio). This will now be described in more detail.

FIG. 7 shows circuitry 32 in the mobile station 2 which is capable of calculating at each mobile station 4, an estimated channel impulse response array H:

$$H=[h_1 \ldots h_M] \quad \text{Equation 1}$$

where $h_m$ is the impulse response between the $m^{th}$ array element (i.e. antenna m of base station 2) and one receiver of a mobile station.

Figure 8:
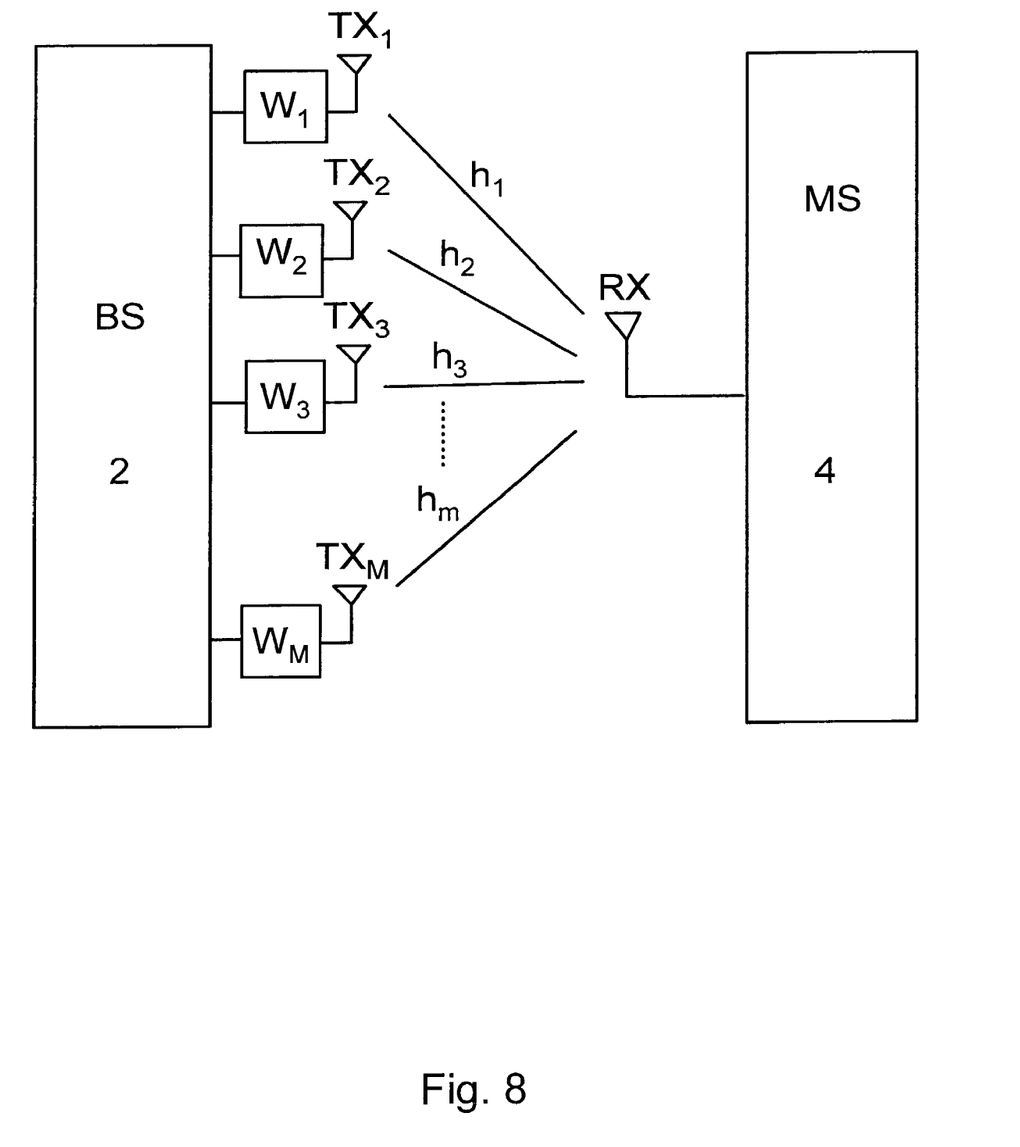
FIG. 8 shows a MISO system.

Thus, equation 1 represents the transmit diversity embodiment shown in FIG. 8, in which the downlink channel capacity is improved by using multiple transmit beams M that are at least in part uncorrelated. A MISO (Multiple Input Single Output) system is formed having multiple antennas at the base station 2 and only one receive antenna at the mobile station 4. Therefore, the mobile station 4 of the present embodiment will calculate M channel impulse responses $h_M$ since there are $TX_1$ to $TX_M$ transmit antennas that are transmitting to the single receive antenna $RX_1$.

Figure 9:
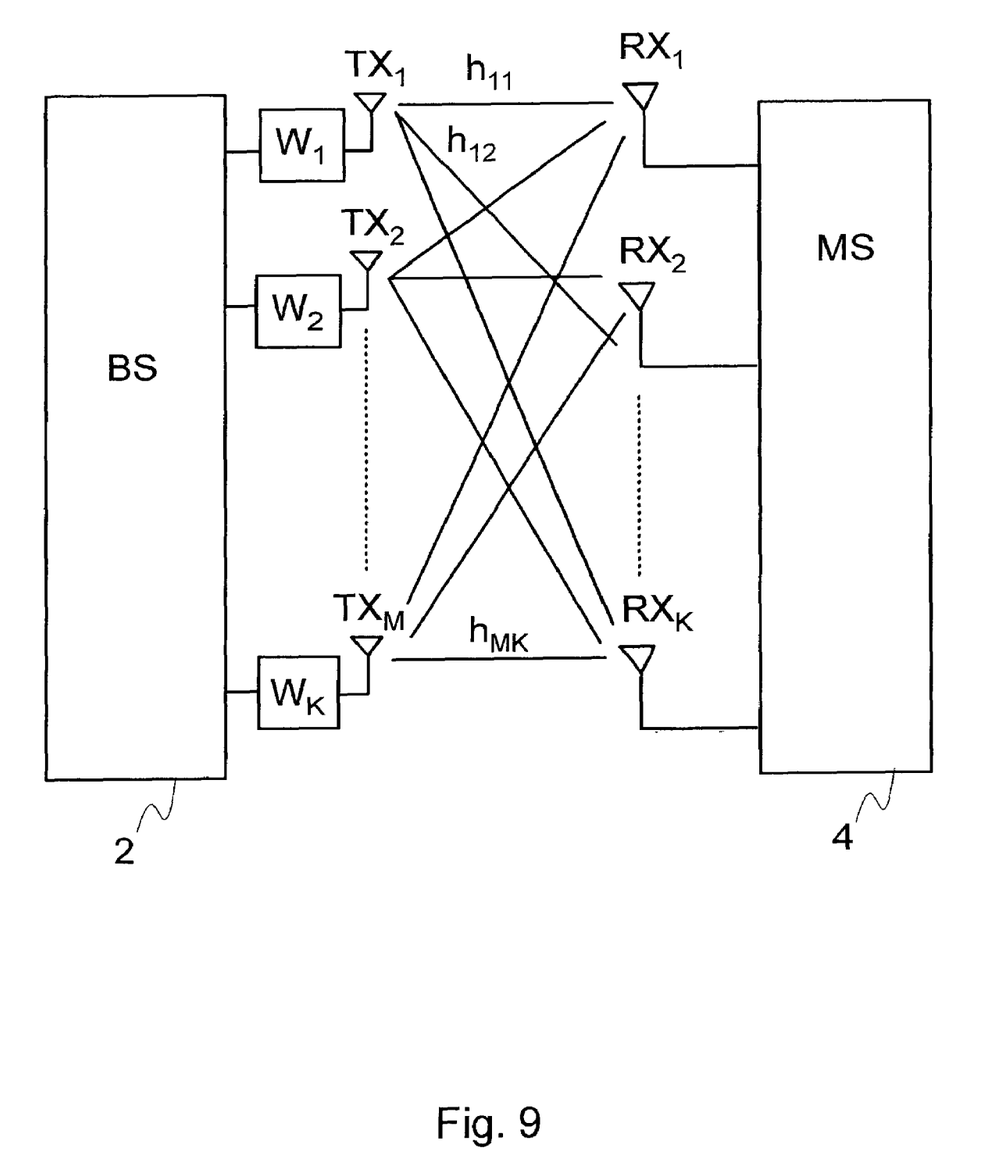
FIG. 9 shows a MIMO system.

A true MIMO (Multiple Input Multiple Output) system having a plurality of receivers $RX_1$ to $RX_K$ for each mobile station is shown in FIG. 9. In relation to the channel allocator described above, it possible that each of the receivers for a particular mobile station 4 will also have the same spatial characteristics as the corresponding transmitters of the base station 2. In some cases it is preferable that K=M for optimal signal reception, however it is possible to use fewer receiver antennas using sophisticated processing algorithms which are known.

For the MIMO case, the channel impulse response matrix H becomes two dimensional in that there are K receiver antennas each able to receive the transmissions of the M transmit antennas, resulting in the augmented H matrix:

$$H = \begin{bmatrix} h_{11} & \ldots & h_{1M} \\ h_{21} & \ldots & h_{2M} \\ \vdots & \ldots & \vdots \\ h_{NI} & \ldots & h_{NM} \end{bmatrix}$$

Thus $h_{NK}$ represents the estimated channel impulse response for the channel formed by the $m^{th}$ transmitting antenna of a base station 2 and received by the $k^{th}$ receiving antenna of a mobile station 4.

The H matrix calculation becomes multidimensional when one considers the multiuser system of FIG. 1, in which each base station 2 will now transmit to a plurality of mobile stations $MS_1$ to $MS_N$, each having one or a plurality of receivers.

The estimate of the channel impulse response $h_{nm}$ being calculated for each channel by transmitting a known training bit sequence or pilot signal and comparing it to the actual training bit sequence or pilot signal received for each channel as is well known in the art and will not be described further herein.

The embodiment of FIG. 7 shows that after the impulse response matrix has been calculated, it is possible to calculate the weighting factor array W using circuitry 34 in the mobile station 4. The weighting factor array W is made up of M weighting factors $w_1$ to $w_M$, each of which is a complex value. For example:

$$w_m = ze^{j\theta}, \text{ where z is the amplitude and } \theta \text{ is the phase.}$$

The weighting array W is then fed back along path 40 to the base station 2 where a particular weighting factor $w_m$ is applied to each of the transmitter antennas $TX_1$ to $TX_M$. The process of applying a particular complex weighting factor to each of the transmitting antennas is known as beamforming in that a specific type of radiation pattern can be produced. According to an embodiment of the present invention the weighting factors are selected to obtain an optimal linear combination of the channels such that the received signal energy (RX Power as described in FIG. 1) is maximised.

Mathematically, the selection of the optimised weighting factors for each mobile station can be calculated as:

$$w_m = \arg\max_w (w H^H H w), \text{ where } \|w\| = 1$$

Alternatively the weighting factor array W can be formed by obtaining the eigenvector corresponding to the largest eigenvalue of the so-called channel correlation matrix R, in which:

$$R = H^H.H, \text{ where } H^H \text{ is the Hermitian transpose matrix} \\ \text{of the estimated impulse response matrix H.}$$

However, it will be appreciated that in a multiuser or MIMO system, a weighting factor array W which is calculated will probably only be optimal for that particular receiver or mobile station. Thus, in the multiuser system of FIG. 1 having N mobile stations, each mobile station will produce from its viewpoint its own optimal weighting vector matrix $W_n$ to receive maximum power. The base station 2 therefore receives N weighting factor arrays W (i.e. $W_1$ to $W_N$) at any point in time.

It is therefore necessary for circuitry in the base station 2 to make an overall decision as to the actual values of the weighting factors $w_m$ that are applied to each transmitter. The channel allocator 3 is best suited for this purpose, since it can base its decision on the estimated SIR or channel quality, or some function of these which takes account of multiple users or services simultaneously. In one embodiment, the channel allocator 3 may decide to find a compromise between the optimal weighting arrays submitted by each mobile station. Alternatively the allocator 3 may decide to produce a radiation pattern whose main lobe enhances the signal transmissions for each of the allocated channels, but nulls or mitigates the interfering signals to the other receivers.

In summary, each mobile station produces its own optimal weighting factor array W comprising each of the weighting factors $w_1$ to $w_M$ for producing spatial diversity (SDMA). However, in a multiuser system having a plurality of N mobile stations, it can be seen that N different weighting factor arrays will be fed back to the base station 4.

In a further embodiment of the present invention, it is envisaged that optimum weighting factor arrays will be determined and selected for particular carrier frequencies. That is, although the impulse response h for each of the channels can be thought of in the traditional sense as being a measure of the channel conditions with respect to time h(t), it is important to understand that the impulse responses will vary depending on the carrier frequency being used by each transmitter, i.e. h(t,f). In FDMA (Frequency Divisional Multiple Access) communication channels are created by transmitting data over different carrier frequencies. Therefore, this embodiment allows the mobile stations to feedback weighting factor information that is also optimised with respect to what frequency produces the optimal channel conditions h. In addition, the mobile station can select the frequency that gives the desired received signal power using a desired transmit matrix W. Also, the mobile station can select dynamically the transmission time, transmission frequency carrier (or subcarrier in multi-carrier or multi-tone systems) and the transport format (for example, CDMA, TDMA, etc or the type of modulation to be used) for at least the selected mobile station using the CQI feedback.

Also, it should be appreciated that the weighting factors $w_m$ can be selected optimally in respect of TDMA (Time Division Multiple Access), which if done correctly will allow multiple users to be placed in the same time slot.

After each mobile station has calculated the weighting factor array W it is now possible for circuitry 36 located in the mobile station station 4 to obtain a new estimated SIR (Signal to Interference ratio) 36 which is a measure of the channel conditions based on the selected weighting factors. The new estimated SIR 36 can be signalled to the base station 2 so that the base station can thus change the array W, and take into account the interference across different channels, and adjust the CQI accordingly.

According to one embodiment the estimated channel quality SIR at the mobile station or at the transmitter can be obtained using the equation:

$$SIR = \frac{\delta \|HW\|}{noise},$$

where $\|HW\|$ is the Frobenius norm representing the sum of the squared elements and divided by the measured noise power.

More generally, an estimated SIR for each channel, for the multiple antenna case of FIG. 8, is obtained using:

$$SIR_m = f(H_m, W_m, noise, \delta),$$

where $\delta$ could be for example the traditional CQI information as used in HSDPA systems. For example, information specifying: the actual Rx power, the modulation scheme used, the multiplexing scheme (SDMA, TDMA, CDMA, FDMA), some required QoS characteristic, etc. Also, it should be appreciated that in certain cases $\delta$ is dependant on the receiver algorithms being used.

Therefore each mobile station 4 can return to the base station 2, for a particular channel, an optimal weighting factor $w_m$ along path 40 and an estimate of the channel state SIR or a corresponding transport format (for example: modulation, coding parameters, transmission rate or power, etc.) along path 38 based on this weighting factor. Physically, this information can be fed back to the base station, 2 for example, by quantising the parameters and then sending them back on the relevant t uplink channel designated to contain feedback information.

For an HSDPA application, the base station 2 is now able to select or determine a CQI value ($CQI_m$ for each channel, using circuitry 30 which decides on the relevant CQI value based on a more intelligent estimate of the channel conditions (i.e. $SIR_m$ or $CQI_m$ depend on the coefficients or beam parameters in matrix $W_m$.

The channel allocation unit 3 therefore serves two primary purposes:
1) It determines the optimum weighting array $W_O$ for beamforming, and
2) It allocates the relevant space, time, code or frequency channel (or combination thereof) based on the optimal weighting factors $w_m$ and channel quality information ($SIR_m$, desired transport format) calculated at the mobile station 4 and fed back, or based on related transport.

It should be appreciated that in one embodiment of the present application, the transport format including for example the coding or modulation schemes used is one of the resources being allocated. Typically, a decoder unit at each receiver is responsible for decoding the received data depending on the modulation scheme used. It should be appreciated that the present application envisages that an estimate of the SIR can either be taken at the input of the channel decoder or in an alternative embodiment at the output of the decoder, for example as is done with turbo or convolution codes. In general the quality measure SIR will depend on the receiver. That is for the same transmission schemes different receivers provide different quality measurements, for example FER, SNR, SINR, etc. These simple quality measurements are known.

Once the $SIR_m$ has been calculated, the equivalent CQI value, or the related transport format parameters that support a given QoS criteria, can be sent via path 42 to the channel allocator 3. The allocator then identifies which channels, if any, can support the channel characteristics corresponding to the specified CQI value. If the channel resources that are needed to support a given QoS are not available, e.g. being used by other channels or services, then according to a further embodiment of the present invention the channel allocator can be more flexible in modifying the required $CQI_m$ value, e.g. by a default amount. For example, if there is no channel available capable of supporting $CQI_1$ then the allocator 3 can be programmed to default to a certain function of the required CQI;

i.e. $CQI_2 = f(CQI_1)$

For example, $CQI_2 = CQI_1 - 3$

Or, $CQI_2 = CQI_1 * 0.5$

Thus if the required $CQI_1$ channel is busy, the scheduler 3 will automatically apply a programmed function to the value to produce a new $CQI_2$ value for the channel allocator 3 to try and match-up to the available channels. It should be understood that this procedure can be an iterative one, in which if the newly generated $CQI_2$ value can also not be provided by another channel since it is already busy, then a further function can be applied for specifying an even lower $CQI_3$ value. However, it should be appreciated that for certain multimedia applications which require a certain QoS to be supported by the channel it is likely that the iterative process will stop when it reaches a certain minimum threshold which can support the particular application.

In another embodiment according to the present invention, if the channel quality measure or $SIR_m$ is relatively low and there is a good chance that there might be many channels which can support the required CQI value of a user or in fact do better, then the mobile station can for example transmit two CQI values, i.e. $CQI_1$ and $CQI_2$, to the base station. The scheduler 3 will identify the channels which can support $CQI_1$ and will check whether any of these channels can support the optimum weighting factor $w_m$. If not, the base station will select $CQI_2$ which is a higher value than $CQI_1$. That is, as explained before the weighting factors may be calculated to achieve optimal beamforming based on the channel impulse responses to try and mitigate any interference. However, in practice it may not be feasible to radically alter all the weights applied to the transmitters which are already engaged in transmission on other channels, but in some cases it might be preferable to transmit on a channel which can at least support the optimal weighting factor for that channel. It may also be possible for the mobile station to transmit two or more CQI values, each of which corresponds to different selections of W, or different transmit solutions altogether. For example, one CQI value (CQI1) corresponds to an optimal selection of W (optimal beamforming), while another CQI value (CQI2) corresponds to STTD (Space Time Transmit Diversity) or some other open-loop multi-antenna or single antenna transmission method. To reduce the required feedback capacity one CQI value may be defined as a differential value compared to the other. For example, CQI1 can be signalled to the base station using only five feedback bits, and only one or two feedback bits are used to determine CQI2 in relation to CQI1. This can be used, for example, when the channel allocator determines that the feedback information determining the W matrix is not up-to-date due to signalling or control delays. Different combination of CQI1 and CQI2 are also possible, e.g. depending on control delays, or the reliability of the control mechanism used.

It needs to be appreciated that the functionality associated with circuitry 34 and 36 for calculating the weighting factor arrays W and the estimated channel conditions SIR do not need to be located in the mobile station and this functionality could be shifted to the base station. Also, at least for the WCDMA TDD (Time Division Duplex) case, no information needs to be fed back from the base station, since there is a pilot channel in the uplink direction from the mobile station to the base station. In this case, the estimated impulse response matrix H, the weighting factors $w_m$, and the estimated SIR* can all be calculated at the base station.

It should be appreciated that embodiments of the present invention are suitable for all types of multiplexing transmission schemes as already described. These also include OFDMA (Orthogonal Frequency Division Multiple Access) techniques as used in WLAN systems, in which for example orthogonal frequencies may be used in the place of spreading codes.

It should be appreciated that the terms "base station" and "mobile station" used throughout are intended to be representative of the equivalent functionality used in wireless communications systems including, for example the equivalent references to "node B" and "user equipment" in 3G and 4G systems. Also, it should be obvious that while the wording "mobile station" has been used, this is non-limiting and the present invention is intended also for mobile stations that are static and not necessary mobile. The mobile station can be a mobile phone, a PDA, a portable computer, a mobile terminal or any other type of user equipment.

The invention claimed is:

1. A method comprising:
   determining a characteristic for each of a plurality of communication channels of a wireless network, wherein the communication channels are formed between a plurality of transmitters and at least one receiver;
   selecting a set of weighting factors to be applied to the plurality of transmitters based on the communication channel characteristics;
   determining for each communication channel a quality indication based on the selected weighting factors; and
   allocating said communication channels depending on said quality indication;
   wherein said quality indication is determined based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and $\delta$ specifies transport format information.

2. A method according to claim 1, wherein the characteristic for each communication channel is a channel impulse response.

3. A method according to claim 2, wherein said set of weighting factors is obtained from the eigenvector corresponding to the largest eigenvalue of a channel correlation matrix R given by the equation: $R=H^H \cdot H$, where $H^H$ is the Hermitian transpose matrix of the estimated impulse response matrix H.

4. A method according to claim 1, wherein the quality indication determined for each communication channel is also based on a transport format.

5. A method according to claim 4, wherein the transport format comprises coding, modulation, transmission rate or signal power information.

6. A method according to claim 1, wherein the quality indication specifies a transport format to be used by the plurality of transmitters.

7. A method according to claim 6, wherein the transport format comprises coding, modulation, transmission rate or signal power information.

8. A method according to claim 1, further comprising providing a plurality of receivers.

9. A method according to claim 8, wherein each receiver selects a set of weighting factors that provides the maximum signal power received at that receiver, thereby providing a plurality of sets of weighting factors.

10. A method according to claim 9, wherein a selection is made from the plurality of sets of weighting factors to provide a decision on a final set of weighting factors to be applied to each transmitter.

11. A method according to claim 10, wherein said decision is based on mitigating the effects of interference from other communication channels.

12. A method according to claim 1, wherein the allocation of said communication channels is prioritized depending on said quality indication.

13. A method according to claim 12, wherein higher priority is given to communications channels of a better quality.

14. A method according to claim 1, wherein said quality indication is an estimate of a communication channel at some future instant in time based on said selected weighting factors being applied to the plurality of transmitters.

15. A method according to claim 1, wherein the set of weighting factors are selected based on the frequency that gives the best characteristic for each communication channel.

16. A method according to claim 1, wherein the wireless network comprises an high speed downlink packet access (HSDPA) network.

17. A method according to claim 16, wherein said quality indication is a channel quality indicator (CQI) which specifies the modulation scheme and the transmission rate.

18. A method according to claim 17, wherein the channel quality indicator (CQI) specifies transmission parameters that maximize the data rate with a given quality of service constraint.

19. A method according to claim 1, wherein each weighting factor making up said set is a complex value having an amplitude and a phase component.

20. A method according to claim 1, further comprising applying said set of weighting factors to plurality of transmitters, wherein said applying said set of weighting factors to the transmitters results in beam forming.

21. A method according to claim 1, wherein δ depends on the receiver algorithm, and the signal to interference ratio (SIR) is measured at the input of a channel decoder.

22. A method according to claim 21, wherein the quality indication is based on the frame error rate or bit error rate.

23. A method according to claim 1, wherein the quality indication is determined at the output of the channel decoder.

24. A method according to claim 23, wherein the quality indication is based on the frame error rate or bit error rate.

25. A system comprising:
   a plurality of communication channels formed between a plurality of transmitters and at least one receiver;
   first estimation circuitry configured to estimate the communication channel characteristics;
   selection circuitry configured to select a set of weighting factors to be applied to the plurality of transmitters based on the communication channel characteristics;
   second estimation circuitry configured to determine communication channel quality based on the selected weighting factor; and
   communication channel allocation circuitry configured to allocate said communication channel depending on the estimated communication channel quality;
   wherein said second estimation circuitry is configured to determine said communication channel quality based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and δ specifies transport format information.

26. The system according to claim 25, wherein the communication channel allocation circuitry comprises:
   circuitry configured to decide on a final weighting array to be applied to each transmitter, and
   circuitry configured to determine a best communication channel specified by time, space, code or frequency resulting in a best set of weighting factors and quality indication for said communication channel.

27. An apparatus comprising:
   characteristic determining circuitry configured to determine a characteristic for each of a plurality of communication channels formed between a base station and the apparatus, wherein the base station comprises a plurality of transmitters;
   selection circuitry configured to select a set of weighting factors to be applied to corresponding transmitters based on the communication channel characteristics; and
   calculation circuitry configured to determine for each communication channel a quality indication based on the selected weighting factors:
   wherein said calculation circuitry is configured to determine said quality indication based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and δ specifies transport format information.

28. The apparatus according to claim 27, wherein said information obtained from said characteristic determining circuitry, said selection circuitry and said calculation circuitry is fed back to the base station, the base station comprising allocation circuitry for allocating communication channels.

29. An apparatus comprising:
   a plurality of transmitters so that a plurality of communication channels are formed between the apparatus and a mobile station;
   characteristic determining circuitry configured to determine a characteristic for each communication channel of the plurality of communication channels;
   selection circuitry configured to select a set of weighting factors to be applied to the corresponding transmitters based on the communication channel characteristics; and
   calculation circuitry configured to determine for each communication channel a quality indication based on the selected weighting factors; and
   allocation circuitry configured to allocate said communication channels depending on said quality indication:
   wherein said calculation circuitry is configured to determine said quality indication based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and δ specifies transport format information.

30. The apparatus according to claim 29, wherein said apparatus is configured to communicate with a plurality of mobile stations, and the apparatus further comprises deciding circuitry configured to receive a plurality of sets of weighting factors corresponding to each of the plurality of mobile stations and to decide on a final set of weighting factors to be applied to the plurality of transmitters.

31. A computer program, embodied on a computer-readable medium, the computer program configured to perform the following:
   calculate a characteristic for each communication channel of a plurality of communication channels in a wireless communication network, wherein the communication channels are formed between a base station having a plurality of transmitters and at least one mobile station having a receiver;

process said communication channel characteristics and selecting a set of weighting factors to be applied to the corresponding transmitters based thereon;

generate, for each communication channel, a quality indicator based on the selected weighting factors; and allocate said communication channels depending on said quality indicator;

wherein said quality indicator is determined based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and $\delta$ specifies transport format information.

32. A computer program according to claim 31, wherein there are a plurality of mobile stations in the wireless network and said computer program is able to perform processing for each mobile station to select a set of weighting factors for each mobile station that results in the maximum signal power being received for that mobile station.

33. A computer program according to claim 32, wherein the computer program decides from the plurality of sets of weighting factors a final set of weighting factors to be applied to the corresponding transmitters.

34. A system comprising:

first estimation means for estimating characteristics of a plurality of communication channels formed between a plurality of transmitters and at least one receiver;

selection means for selecting a set of weighting factors to be applied to the plurality of transmitters based on the communication channel characteristics;

second estimation means for determining communication channel quality based on the selected weighting factor; and communication channel allocation means for allocating said communication channel depending on the estimated communication channel quality;

wherein said second estimation means is configured to determine said communication channel quality based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and $\delta$ specifies transport format information.

35. An apparatus comprising:

characteristic determining means for determining a characteristic for each of a plurality of communication channels formed between a base station and the apparatus;

selection means for selecting a set of weighting factors to be applied to corresponding transmitters of the base station based on the communication channel characteristics; and calculation means for determining for each communication channel a quality indication based on the selected weighting factors;

wherein said calculation means is configured to determine said quality indication based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and $\delta$ specifies transport format information.

36. An apparatus comprising:

a plurality of transmitters so that a plurality of communication channels are formed between the apparatus and a mobile station having at least one receiver;

characteristic determining means for determining a characteristic for each communication channel of the plurality of communication channels;

selection means for selecting a set of weighting factors to be applied to the corresponding transmitters based on the communication channel characteristics;

calculation means for determining for each communication channel a quality indication based on the selected weighting factors; and allocation means for allocating said communication channels depending on said quality indication;

wherein said calculation means is configured to determine said quality indication based on an estimated signal to interference ratio given by $$SIR = \frac{\delta \|HW\|}{\text{noise}},$$

where H is an estimated impulse response matrix, W represents said set of weighting factors, $\|HW\|$ is the Frobenius norm of HW, noise is measured noise power and $\delta$ specifies transport format information.

\* \* \* \* \*